United States Patent [19]

Coutellier et al.

[11] Patent Number: 4,939,835
[45] Date of Patent: Jul. 10, 1990

[54] METHOD FOR ACHIEVING THE PLANAR SURFACE OF AN ACTIVE FACE FOR A MAGNETIC RECORDING/READING HEAD

[75] Inventors: Jean-Marc Coutellier, Maurepas; Alain Jacobelli, St Michel Sur Orge; Henriette Magna, Antony; Paul-Louis Meunier, Paris, all of France

[73] Assignee: Compagnis Europeenne de Composants Electroniques, Courbevoie, France

[21] Appl. No.: 366,954

[22] Filed: Jun. 16, 1989

[30] Foreign Application Priority Data

Jun. 24, 1988 [FR] France .................................. 88 08527

[51] Int. Cl.⁵ .............................................. G11B 5/42
[52] U.S. Cl. ...................................... 29/603; 360/122
[58] Field of Search .................. 29/603; 360/119–121, 360/122

[56] References Cited

U.S. PATENT DOCUMENTS

| | | |
|---|---|---|
| 3,104,455 | 9/1963 | Frost ........................................ 29/603 |
| 3,229,355 | 1/1966 | Hluszko .................................. 29/603 |
| 3,486,220 | 12/1969 | Braun et al. . | |
| 3,614,831 | 10/1971 | Grundtner et al. . | |
| 4,675,988 | 6/1987 | Matsuzawa ............................. 29/603 |
| 4,821,403 | 4/1989 | Rolland et al. . | |

OTHER PUBLICATIONS

Patent Abstracts of Japan, vol. 7, No. 231 (P-229) [1376], 13 Oct. 1983; & Jp-A-58 121 120 (Hitachi Seisakusho K. K.) 19-07-1983.

Xerox Disclosure Journal, vol. 9, NO. 4, Juillet/Aout 1984, pp. 235–236, Stamford, Conn., US: M. R. Campanelli: "Silicon–Sealed, Thin–Film Magnetic Head Image Bar" p. 236.

Patent Abstracts of Japan, vol. 5, No. 150 (P-81) [822], 22 Sep. 1981; & JP-A-56 83 869 (Fujitsu K. K.) 08-07-1981.

Primary Examiner—Carl E. Hall
Attorney, Agent, or Firm—Pollock, VandeSande & Priddy

[57] ABSTRACT

A method for achieving the planar surface of an active face for magnetic recording/reading heads. The planar surface of the active face is obtained by grinding, the active face being of the type where, before the grinding operation, the level of the material forming the gap is recessed with respect to the magnetic poles, the method comprising depositing over the recess a thin layer of non-magnetic material with a thickness at least equal to the recess of the gap. The non-magnetive thin layer may then be ground to obtain the planar surface of the active face.

2 Claims, 3 Drawing Sheets

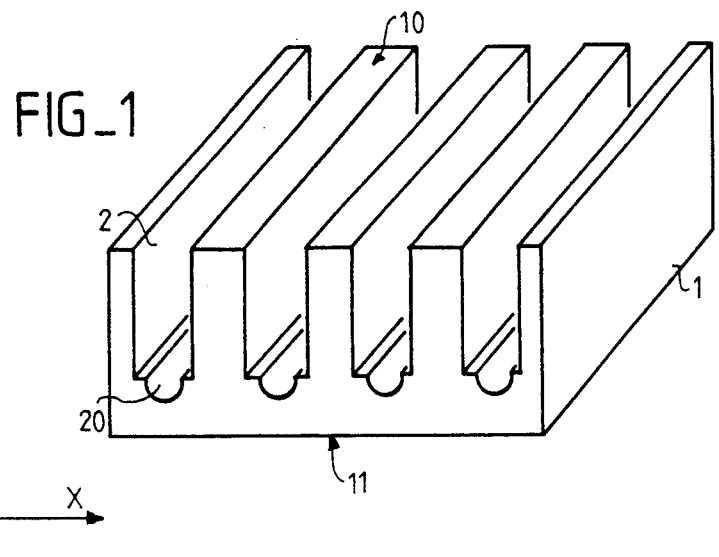
FIG_1
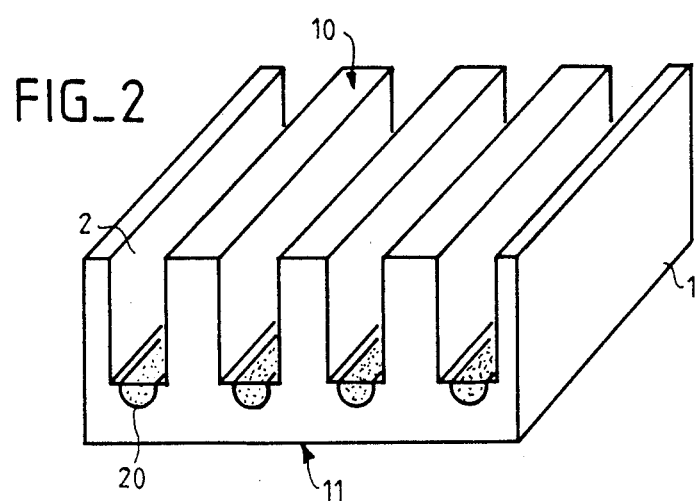
FIG_2
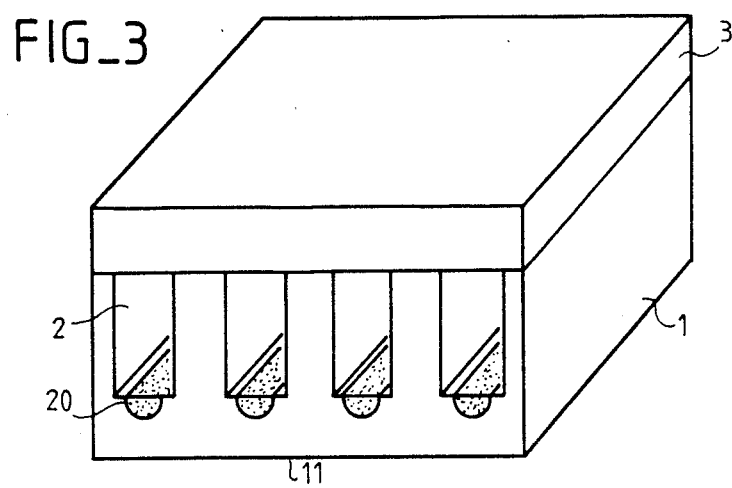
FIG_3

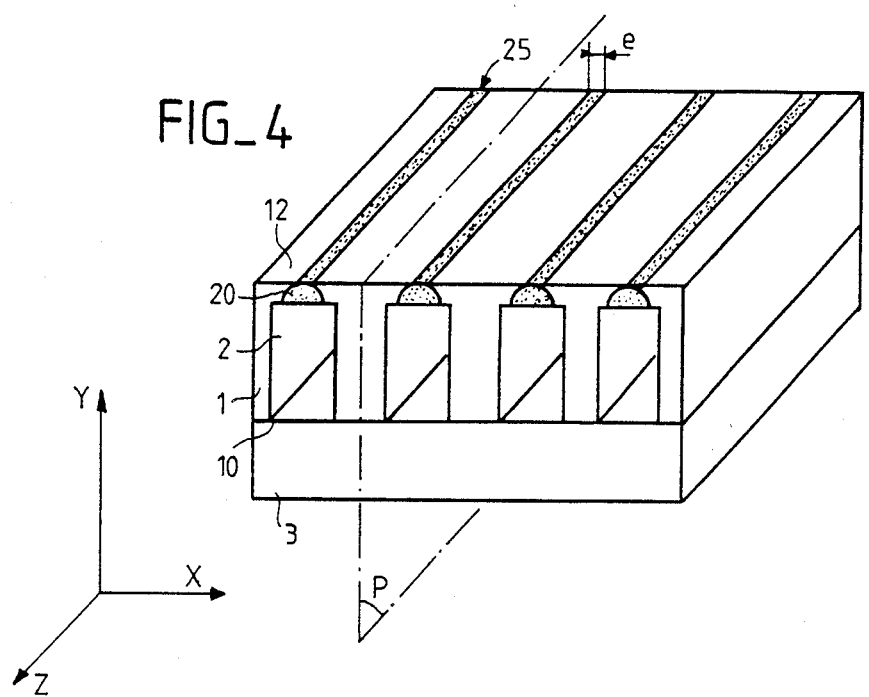
FIG_4
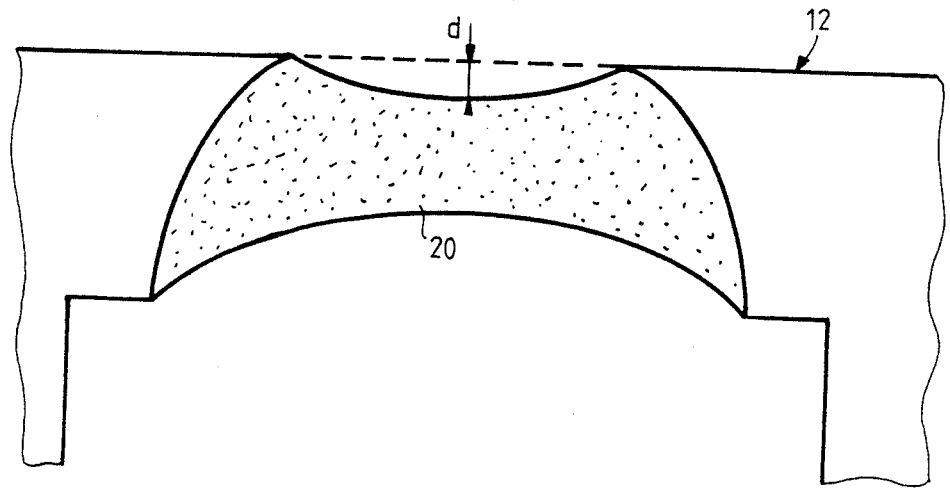
FIG_5

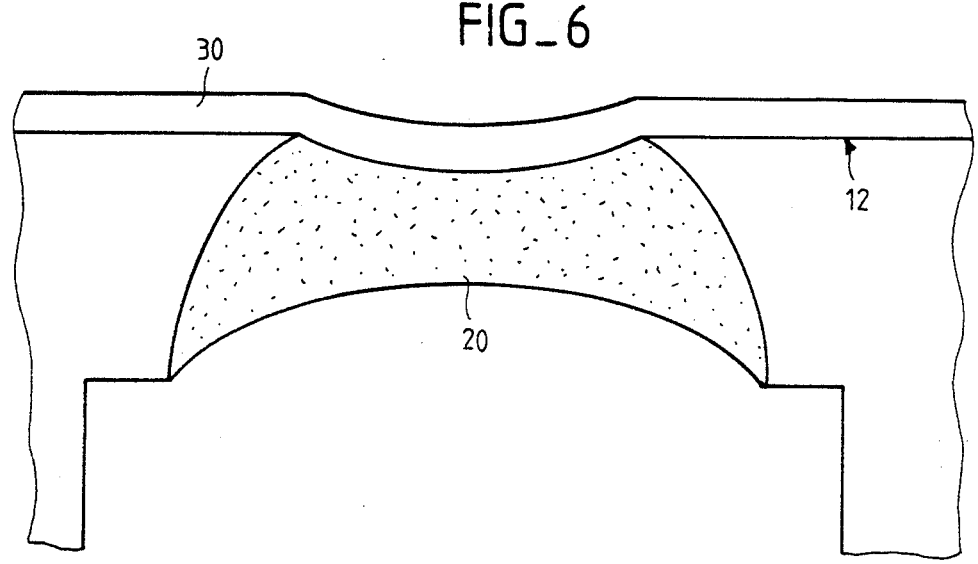
FIG_6
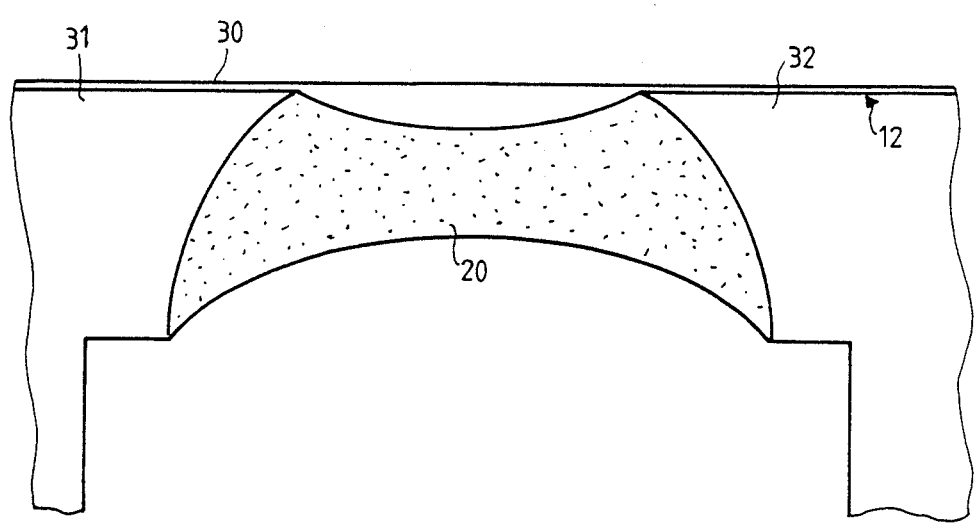
FIG_7

METHOD FOR ACHIEVING THE PLANAR SURFACE OF AN ACTIVE FACE FOR A MAGNETIC RECORDING/READING HEAD

BACKGROUND OF THE INVENTION

1. Field of the Invention

The invention concerns a method for providing the planar surface of an active face for magnetic recording/reading heads, the planar surface of the active face being obtained by grinding.

2. Description of the Prior Art

A magnetic reading and/or recording head is formed by a ring-shaped magnetic circuit cut by a narrow gap consisting of a non-magnetic material.

Magnetic heads can be classified under three major groups:

massive heads are made by machining and joining two semi-heads, made of magnetic material, such as video heads (VHS heads) or analog audio heads. These heads are coiled at the end of the fabrication method;

thin layer heads are made by successive deposition of magnetic, dielectrical and conductive materials. These layers undergo masking and etching operations which enable the magnetic circuit, the gap and the conductive turns to be obtained;

heads having, on either side of the gap, a magnetic metallic alloy with a thickness that varies between 0.1 and 40 micrometers, the rest of the magnetic circuit and the conductive turns being made in the same way as for the massive heads. These are so-called MIG (metal in gap) heads which are used today in 8 mm. or RDAT (rotary digital audio tape) systems.

In the method of fabrication of a magnetic recording/reading head, it is often necessary to machine a heterogeneous part, formed by the association of a magnetic material (ferrite for example) and a non-magnetic material (glass for example). This is the case, notably, for the fabrication of the magnetic head described in the French patent application by the present applicant, filed under No. 87 14824. If a magnetic thin layer has to be deposited on this machined head, as for the magnetic head described in the French patent application by the present applicant, filed under No. 87 14820, it is necessary to have an excellent surface quality.

However, during grinding of a heterogeneous part, the two materials forming this heterogeneous part wear out. This differential wear is all the greater when the materials have different hardness. This is particularly so in the case of ferrite which is usually ground with a mixture of diamond powder, and of glass which is usually ground with cerium oxide. The plane thus machined therefore has a defect due to the irregular surface which may be incompatible with the requirements of the following steps for making the magnetic head.

To overcome this problem, the invention proposes a new method of achieving the planar surface of an active face of magnetic recording/reading heads, which permits the deposition of a non-magnetic material on the active face, before the grinding operation.

SUMMARY OF THE INVENTION

An object of the invention to provide is a method for producing the planar surface of an active face for magnetic recording/reading heads, the planar surface of the active face being obtained by grinding, the active face being of the type where, before the grinding operation, the level of the material forming the gap is recessed with respect to the magnetic poles. The method comprises the following steps:

depositing on said active face a thin layer of non-magnetic material having a thickness at least equal to the recess of the gap, and, grinding the non-magnetic thin layer to obtain the planar surface of the active face.

BRIEF DESCRIPTION OF THE DRAWINGS

The invention will be better understood and other advantages will appear from the following description, given as a non-restrictive example, and through the appended drawings, of which:

FIGS. 1 to 4 show different steps of a method for the fabrication of magnetic heads according to the prior art;

FIG. 5 is a detailed view of FIG. 4;

FIGS. 6 and 7 show the two steps at the fabrication method according to the invention.

DESCRIPTION OF THE PREFERRED EMBODIMENTS

The invention applies particularly well, but not exclusively, to the situation where, before performing the standard grinding step, there is a recess in the non-magnetic material with respect to the active face of the head.

According to the already referenced French patent application No. 87 14824, a recording/reading head can be made in the following way.

During a first step, one or more hollows are made in a substrate 1 of magnetic material, such as a block of ferrite, these hollows being substantially perpendicular to a main face of the substrate. FIG. 1 thus shows a substrate 1 in which four hollows, such as 2, have been made. These hollows are perpendicular to the face 10 of the substrate. At the bottom of the hollows, there is a narrowed portion 20. These hollows all have the same depth, and they do not reach the face 11 opposite the face 10.

During a second step, the narrowed portions, such as 20, are filled with a magnetic material. For example, a glass-based material is cast. Thus, a structure such as that of FIG. 2 is obtained.

During a third step shown in FIG. 3, a wafer 3 of a magnetic material is fixed to the face 10 of the substrate. This wafer closes the hollows made earlier and can be used to close the magnetic circuit of the head.

During a fourth step, the face 11 of the substrate is machined parallel to the bottoms of the hollows. The narrowed portions 20 are reached, and the machining is complete when gaps such as 25, made of the non-magnetic material and having a desired width e, are obtained. Thus, a structure such as the one shown in FIG. 4 is obtained. The precision of the width of the gap is adjusted by the thickness of the machining of the face 11.

In fact, at this stage of manufacture, on the active face 12, there is a recess of the non-magnetic material with respect to the magnetic material. This recess is due to the difference in hardness between the magnetic and non-magnetic materials. FIG. 5 is an enlarged view of a detail of FIG. 4, showing recesses in the glass with respect to the magnetic material and, especially, at the active face 12.

There should be a good quality surface for the active face 12. As a rule, it is desired to obtain a mean value of the order of 0.4 $\mu$m for the undulation of the surface of the active face, the maximum value of the undulation being smaller than 1 μm. This is the purpose of the grinding operation.

According to the invention, a non-magnetic thin layer consisting, for example, of silica or alumina is deposited on the active face 12. This layer may be obtained by any deposition method, for example, by sputtering or vapor deposition. The thickness of the deposited layer should be at least equal to the amplitude of the recess d in the non-magnetic material.

FIG. 6 shows this step of the method, the non-magnetic layer 30 covering the entire active face 12.

Again according to the invention, the thin layer 30 is ground until only a very fine film of the material forming this layer is left on the magnetic poles 31 and 32 of the active face 12. There, is then an active face meeting the requisite criteria of flatness since the grinding has been done on only one material. The grinding technique used for the material of the layer 30 does not raise any problems for persons skilled in the art.

The magnetic head is then finished as indicated, for example, in the French patent application No. 87 14824. The structure made is cut into individual magnetic circuits The cutting is done along planes such as P which are located between the hollows and are parallel to the axis of the hollows. Since the structure of FIG. 4 is placed in a trihedron XYZ, with the faces 10 and 11 parallel to the plane XZ, the planes such as P are parallel to the plane ZY.

Then, the cutting is also done along planes not shown, parallel to the plane YX.

During a subsequent step, each magnetic circuit is provided with a coil, wound by means of the notch 2 around an arm of the magnetic circuit.

The invention is not restricted to the example described above. The steps of the method according to the invention that make it possible to achieve the plane surface for the active face (the step providing a non-magnetic thin layer and the grinding step) can be applied in other embodiments without raising any difficulties for those skilled in the art.

The method according to the invention has the further advantage of being capable of being applied to the batch production of magnetic heads.

What is claimed is:

1. A method for achieving a plane surface on an active face of magnetic recording/reading heads during manufacture, wherein the active face is obtained by grinding to create magnetic pole surfaces and to expose a gap filled with non-magnetic material, the level of the material in the gap being recessed, with respect to adjacent magnetic pole surfaces, comprising the following steps:

depositing on said active face a thin layer of non-magnetic material with a thickness at least equal to the depth of the recess of the material in the gap, thereby filling said recess; and, the deposited non-magnetic thin layer to obtain a planar surface on the active face.

2. A method according to claim 1, wherein the thin layer of non-magnetic material is alumina or silica.

* * * * *